United States Patent [19]

Hsu et al.

[11] Patent Number: 5,207,354
[45] Date of Patent: May 4, 1993

[54] METERED FLUID VALVE WITH SWITCHABLE OUTLETS

[76] Inventors: Shih-Kai Hsu, 2059 E. 2700 South, Salt Lake City, Utah 84109; Chih-Min Lin, 5 Fl., 20, Aly, 3, Ln. 524, Sec. 5, Taipei, Taiwan

[21] Appl. No.: 787,602
[22] Filed: Nov. 4, 1991
[51] Int. Cl.[5] ............................................. B67D 5/30
[52] U.S. Cl. ........................... 222/16; 222/17; 222/20; 239/66; 137/119; 137/624.2; 137/624.14
[58] Field of Search ................ 222/14, 16, 17, 20, 222/22; 239/66, 68; 137/119, 624.2, 624.14, 624.18

[56] References Cited
U.S. PATENT DOCUMENTS

| | | | |
|---|---|---|---|
| 1,859,357 | 5/1932 | Elder | 137/119 |
| 2,929,534 | 3/1960 | Trubert | 222/20 |
| 3,097,762 | 7/1963 | Charnota | 222/20 |
| 3,169,666 | 2/1961 | Rinkewich | 222/20 |
| 3,187,943 | 6/1965 | Wolf | 222/20 |
| 3,473,695 | 7/1969 | Anesi | 222/20 |
| 3,779,269 | 12/1973 | Gould | 137/119 |
| 3,964,685 | 6/1976 | Chauvigne | 239/66 |
| 4,077,424 | 3/1978 | Ehret et al. | 137/119 |
| 4,214,602 | 7/1980 | Pradillon | 222/16 X |
| 4,316,480 | 2/1982 | Kah, Jr. | 137/119 |
| 4,570,663 | 2/1986 | Gould et al. | 137/119 |
| 4,708,264 | 11/1987 | Bruninga | 222/20 |
| 4,817,656 | 4/1989 | Gould | 137/119 X |
| 5,082,022 | 1/1992 | Boundy | 137/624.2 X |
| 5,100,056 | 3/1992 | Theodorsen et al. | 239/66 X |

FOREIGN PATENT DOCUMENTS 112404  8/1980  Japan ................................. 137/119

Primary Examiner—Andres Kashnikow
Assistant Examiner—Kenneth Bomberg
Attorney, Agent, or Firm—James L. Sonntag

[57] ABSTRACT

A valve suitable for lawn and garden irrigation with a fluid inlet and two fluid outlets and a means for switching the flow of water from one outlet to the other based upon a predetermined flow of water. A plurality of valves may connected in series to irrigate several garden areas by connecting the inlet of each valve with the second outlet of the previous valve, except the inlet of the first valve which communicates with a water source.

15 Claims, 9 Drawing Sheets

METERED FLUID VALVE WITH SWITCHABLE OUTLETS

FIELD OF THE INVENTION

The present invention relates to metered valves that allow a measured amount of fluid to pass through the valve. The valves of the invention are preferably used to control the amount of water applied to a lawn or garden.

BACKGROUND OF THE INVENTION

In the watering of lawns and gardens, it is convenient to have a means for automatically turning the water on and off, particularly where there are several watering sections that must be sequentially turned on and off. Commonly used systems for sequentially turning on and off a series of watering sections comprise a solenoid controlled valve for each watering section, with the respective solenoid controlled valves connected to a common fluid source. An electric control system controls the solenoid valves by electrically signalling the valves to turn on or turn off. Thus, it is possible to program the beginning time and watering time for each watering section. The problem with these systems is that the length of watering time for lawns and gardens is ideally determined by the amount of water passing through the valve to the lawn, rather than a set watering time as provided by these systems. In addition, the amount of water delivered to the lawn is dependent upon the water pressure. When the fluid pressure is lower than normal and the rate of fluid flow is less, the lawn or garden may be underwatered. In addition, the electric solenoid systems are expensive and are adapted primarily for in-ground water irrigation systems, and are not easily used by those watering with a hose connected to a hose bib.

Other devices used for the automatic watering, are metered water timers. Examples of metered water timers are described in U.S. Pat. Nos. 2,929,534, 3,097,762, 3,473,695, 3,187,943, 3,169,666, and 4,708,264. These devices generally function by metering the water as it passes through the valve. The valves are operated by manually setting and opening the valve. After the amount of water passing through the valve reaches a preset amount, the valve automatically shuts off the fluid flow. Thus, these valves are not fully automatic as they require manual resetting and restarting after a watering sequence in finished.

Metered valves have the advantage of having the watering time based upon fluid flow instead of a fixed time. However, these prior-art metered timers are not easily adapted for use with multiple watering sections. One may have several timers connected to a water source for different watering sections, but to water the different sections sequentially, one must manually start each timer after the preceding timer has finished its cycle. Thus, a fully automatic watering sequence is not possible with these valves. While it is possible to combine these valves with a mechanical or electronic timer to automatically open these valves at a preset time, fully automatic operation is still difficult. Each timer/valve combination operates independently, thus, each timer and valve must be carefully programmed separately to prevent overlapping watering times. In addition, the adding of the timer to the valve lowers the mechanical reliability and increases the cost of the system.

OBJECTS OF THE INVENTION

It is, therefore, an object of the invention to provide an automated metered watering valve, in which the timing is based upon the amount of water going through the valve, and the watering timing and sequencing can be operated automatically without manual resetting.

It is therefore an object of the invention to provide a metered liquid valve system that is easily adapted to multiple watering sections.

It is also an object of the invention to provide a metered liquid valve that is resetting, i.e., does not require manual resetting to restart the watering sequence.

Other objects of the invention will become evident in the following discussion.

SUMMARY OF THE INVENTION

An embodiment of the invention is a fluid control valve comprising;

(1) a housing having a fluid inlet, a first fluid outlet and a second fluid outlet, (2) a fluid switching means having a default state and an active state, which switching means in the default state directs fluid flowing through the housing from the inlet out through the first outlet and in the active state from the inlet out through the second outlet, (3) a setting means that changes the switching means from the default state to the active state, (4) a fluid metering means interlocked with the setting means such that after a predetermined amount of fluid has passed though the housing out through the first outlet the setting means changes the switching means from the default state to the active state, and (5) a resetting means that resets the switching means from the active state to the default state after fluid has essentially ceased to flow through the valve.

The housing provides the support for mechanical parts of the valve, as well as fluid conduits for flow of fluid from the inlet to either the first or second outlet. The inlet of the housing is adapted for attachment to a fluid source, such as water. Preferably the inlet includes a female thread adapted for attachment to a conventional hose bib or male hose thread. The fluid flows through the valve housing, out through either the first outlet or the second outlet, as further described below. Each outlet is adapted for attachment to a means to convey the fluid to its desired destination, such as a pipe or a hose. Preferably each outlet includes a male thread for attachment to a conventional water hose.

The fluid switching means functions to direct fluid flowing through the valve out either of the first or second outlet. The fluid switching means has two states, a default state and an active state. In the default state, the fluid is directed from the inlet out through the first outlet, and in the active state the fluid is directed from the inlet out through the second outlet.

The state of the switching means may be determined by a setting means which changes the switching means from the default state to the active state. The switching means may be energized by pressure of the fluid flowing through the valve. This may be provided by a switching means comprising a pressure surface, such that force from the pressure of the fluid flowing through the valve against the pressure surface energizes the switching means to move it from the default state to the active state when activated by the setting means.

The setting means is interlocked with a fluid metering means, such that after a predetermined amount of fluid has passed though the valve while in the default state, the setting means is activated to change the switching means from the default to an active state, thereby changing the outflow of water from the first outlet to the second outlet.

The valve is reset by a resetting means when the source of water is cut off. The resetting means changes the switching means from the active state to the default state when water ceases to flow through the valve. The resetting means may comprise a spring that opposes the force of a pressure surface. While fluid is flowing through the valve while the switching means is in the active state, the pressure of the fluid compresses the spring and holds the switching means in the active state. When the flow of fluid is interrupted, the pressure on the pressure surface is released causing the spring to extend and change the switching means from the active state to the default state.

By using one valve of the invention, one can automatically water two watering sections. When the water source is turned on water is directed out through the first outlet to the first of the watering sections. After a preset set amount of water has flowed to the first section, water is automatically directed out through the second outlet to a second watering section. When the water source is turned off, the valve resets the function the same when the water is turned on again. Fully automatic operation is achieved when the water source is controlled by a master valve that merely turns the water on and off. Three watering sections can be automatically watered in a like matter by attaching the second outlet with a hose to the inlet of a second valve of the invention. As more fully described below, more watering sections can be automatically watered by adding more valves in series in a like manner, with valve inlets attached or communicating with second outlets of adjacent valves, except the first valve in the series that communicates with a water source. Conduits, such as hoses, for each watering section are attached to the first outlets of the valve, and the second outlet of the last valve in the series, which are the connected to watering devices. As many valves as required can be added to provide a water outlet for each watering section.

DETAILED DESCRIPTION OF THE INVENTION

Figure 1A:
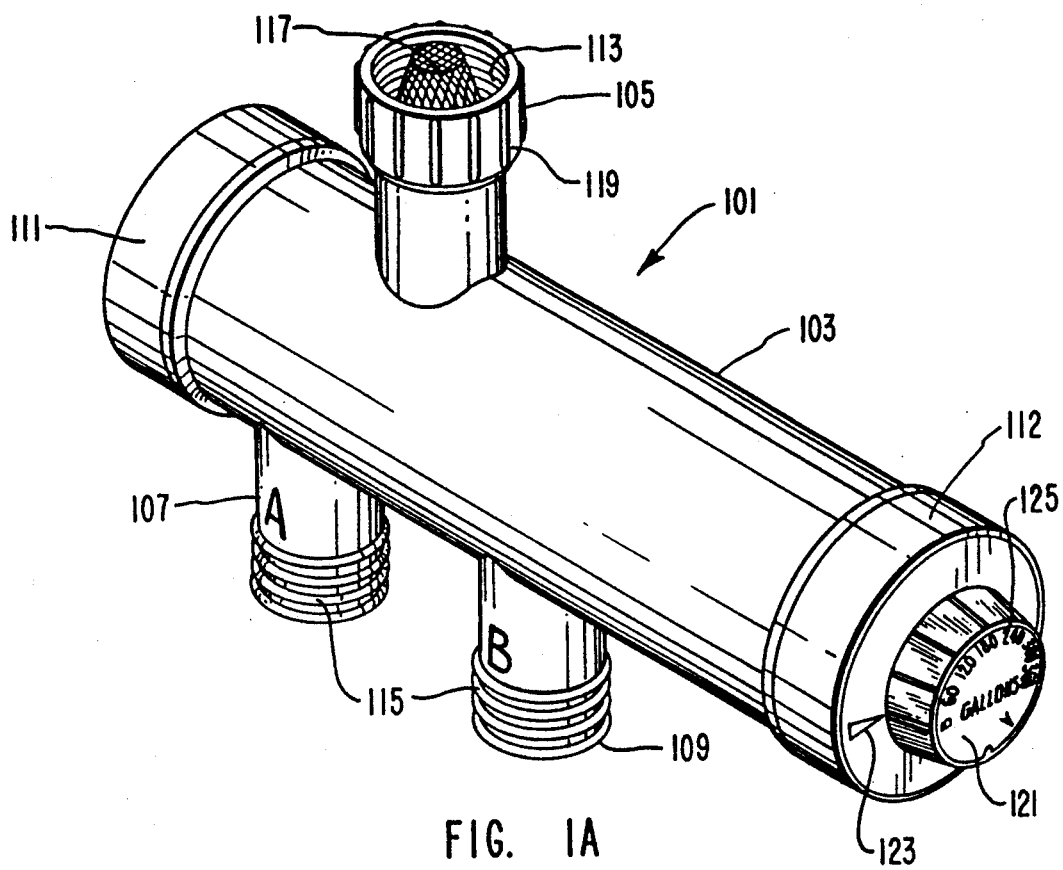
FIGS. 1a and 1b are perspective views of a valve of the invention.
Figure 1B:
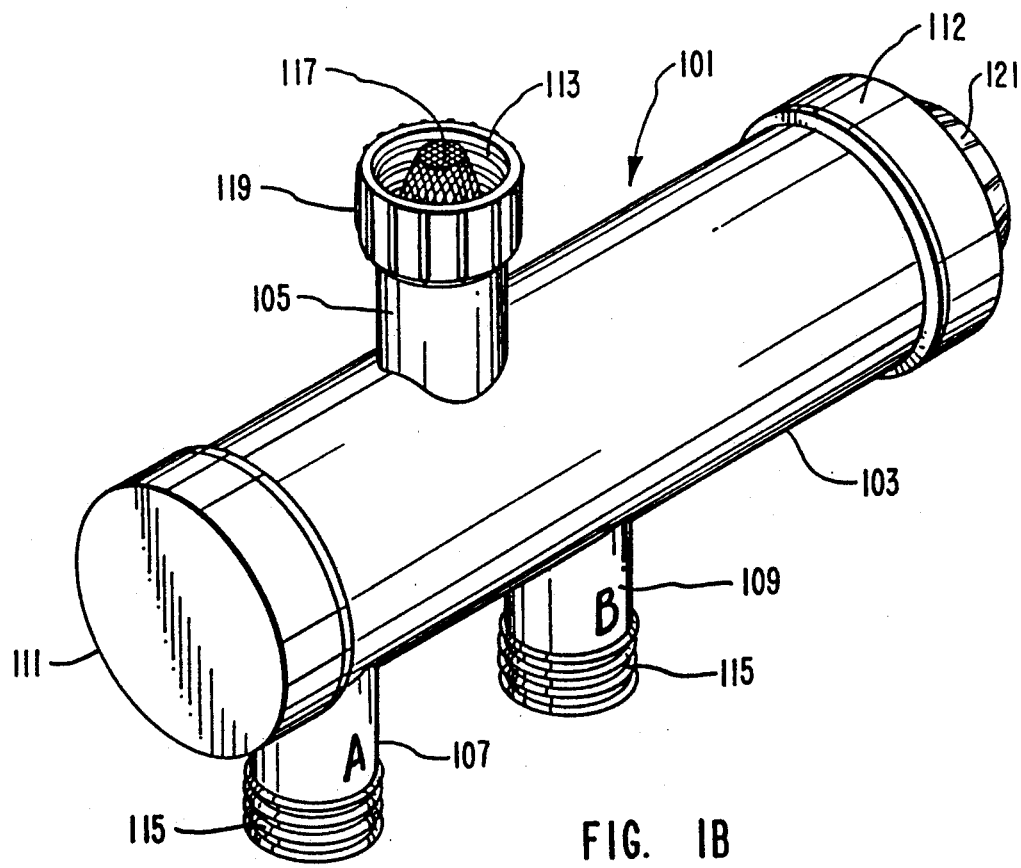

Referring to FIGS. 1a and 1b, which are different a perspective views of a valve of the invention designed for lawn and garden water irrigation. Shown is the valve 101 and the exterior of the housing 103 of the valve showing a fluid inlet 105, a first fluid outlet 107, and a second fluid outlet 109. The housing 103 is generally constructed as a tube with end caps 111, 112. The fluid inlet 105 and both fluid outlets 107,109 are provided with female and male threads 113,115 respectively for attachment to conventional lawn watering hoses. For convenience to the user, the first and second fluid outlets 107,109 are labeled "A" and "B" respectively. Also shown at the inlet 105 is a filter 117 to prevent large solid objects from entering valve and damaging its mechanism, and a coupling nut 119 to aid the turning of the valve onto a hose.

A knob 121, which forms a part of the preset means described below, allows the user to set the watering water volume before fluid outflow changes from the first outlet 107 to the second outlet 109. The knob 121 is placed over end cap 112 with a reference arrow 123 to indicate the setting of the knob 121. Indications 125 on the knob 121 show the volume of fluid which will flow through the first outlet before it changes to the second outlet. The predetermination water volume is accomplished by rotating the knob 121 counterclockwise from the B position to the desired setting. At the B position, water flow will switch to the second outlet 109 as soon as water starts flowing through the valve. BY rotating the knob counter-clockwise (in FIG. 1) from the B position to the A position, the valve mechanism can be locked such that fluid will continue indefinitely to flow from the first outlet 107.

Figure 2:
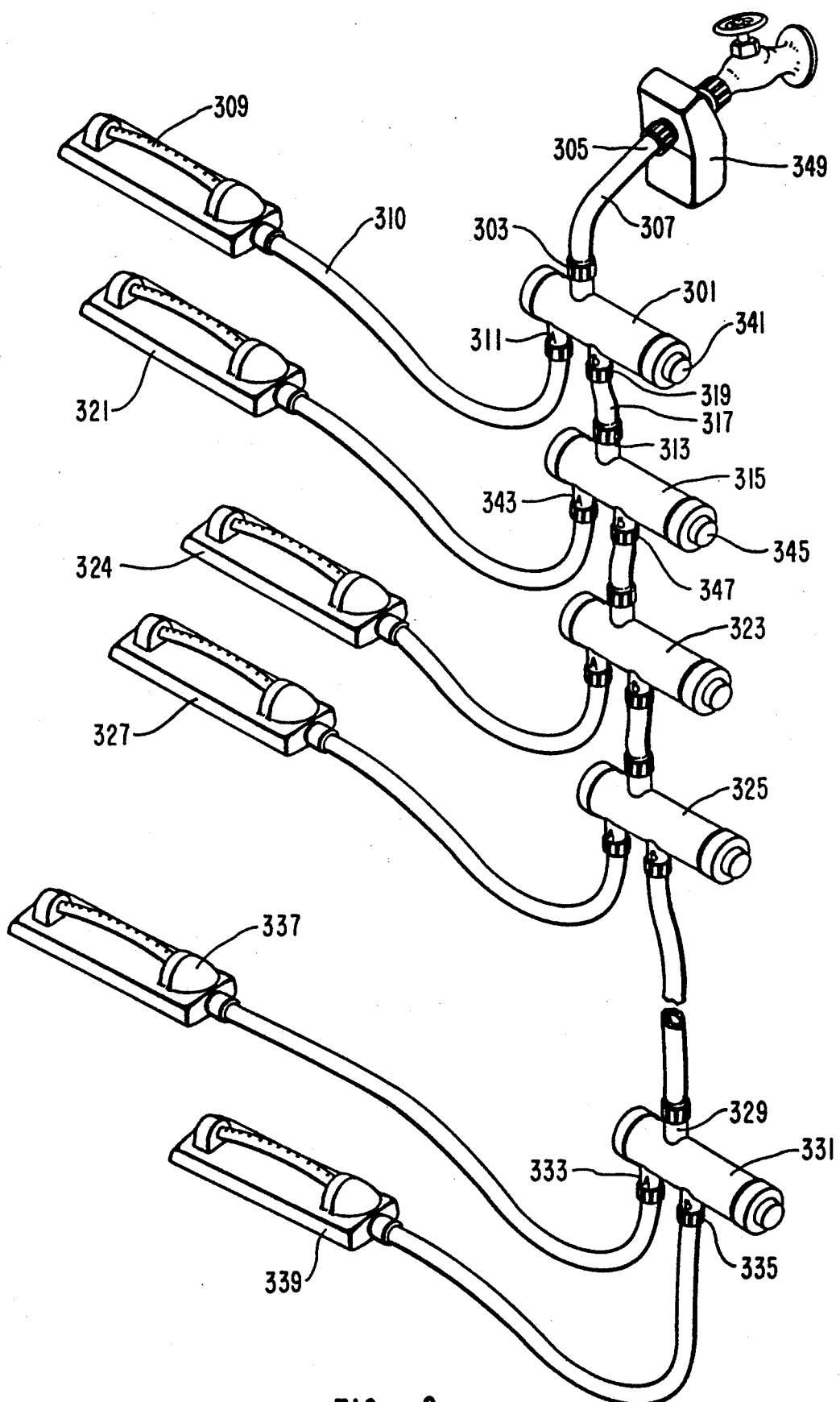
FIG. 2 is a perspective view showing a plurality of valves connected in series for control of several watering sections.

FIG. 2 shows a watering system of several valves as in FIGS. 1a and 1b connected in series so as to automatically water several watering sections. First valve 301 is connected at its fluid inlet 303 to a water source 305 by means of a conventional water hose 307. A first watering device 309 is attached to the A or first outlet 311 of the first valve 301 by means of hose 310. The inlet 313 of a second valve 315 is attached by means of a hose 317 to the B or second outlet 319 of the first valve 301. A second watering device 321 and third valve 323 are similarly attached to the second valve 315. This sequence is continued to add as many valves as necessary. In the figure are shown a third watering device 324 fourth valve 325 and a fourth watering 327 device. The inlet 329 of the last valve 331 is attached to the B or second outlet of the second to the last valve in the sequence (not shown). Both the first outlet 333 and second outlet 335 of the last valve 331 are attached to watering devices 337,339. By connecting valves of the invention in this manner, any number of watering devices greater two can be controlled, with the number of valves required being one less than the number of watering devices.

In operation of a watering system such as in FIG. 2, all of the setting means of the valves will be in the default state before any water in turned on. This is insured by the resetting means which changes the valve to the default state when flow of water through the valve is stopped. When the water in initially turned on, because the first valve 301 is in the default state the water will flow through the first valve 301 and out its first outlet 311 to the first watering device 309. After a predetermined water flow determined by the setting of the knob 341 of the first valve 301, water will begin to flow from its second outlet 319 into the second valve 315. As the water begins to flow into the second valve 315, the water will initially flow out through its first outlet 343 to the second watering device 321, which will continue for a water flow determined by the setting its knob 345 at which time the water flow will be switched to the second outlet 347 and be directed to the third valve 323. Each valve in the series will function sequentially in a like manner causing the watering devices to operate sequentially, with the watering times determined by the knob settings on each of the valves. For the last valve 331, water will initially flow though its first outlet 333 for the predetermined water flow and then through its second outlet 335 to the last watering device 339 in the sequence. Water will continue to flow to the last watering device 339 until the flow at the water source 305 is halted. When the flow at the water source is halted 305, all the valves with switching means in the active state (water flowing through the second outlets) will reset to the default state, and thus be ready for the next watering session. The flow from the water source 305 may be controlled manually, or by an automatic on/off valve 349, such as those of the prior art described above. If a fully automatic on/off valve is used, in which the water source is automatically turned on and then off, then the entire watering process may be conducted automatically without any manual intervention by the user.

Figure 3:
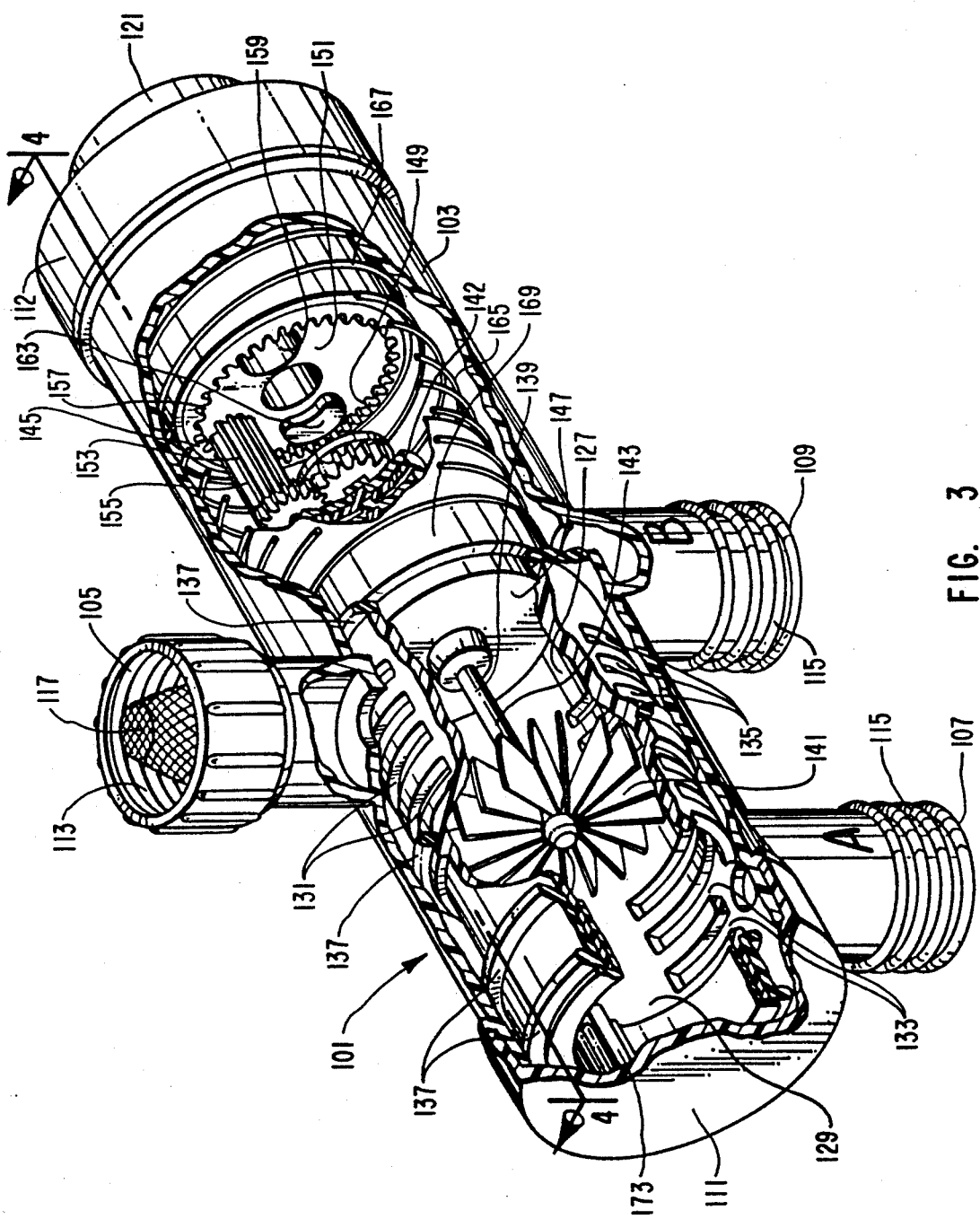
FIG. 3 is a perspective view of a liquid valve as in FIG. 1b, but with the valve partially in section, showing the setting means in the default state.

FIG. 3 is perspective view in partial section of the valve 101 of the invention FIG. 1. In the illustrated embodiment the housing 103 is tubular and a switching means 127 is disposed in the housing. The switching means 127 comprises a tube 129 that freely slides within the casing. In the wall of the tube 129 are three sets of perforations; (1) inlet perforations 131 to allow fluid flow from the inlet 105 in the housing into the interior of the tube 129, (2) first outlet perforations 133 to allow fluid flow from the interior of the tube 129 to the first outlet 107, and (3) second outlet perforations 135 to allow fluid flow from the interior of the tube 129 to the second outlet 109. The switching means 127 also comprises annular seals 137 between the inner surface of the housing 103 and the outer surface of the perforated tube 129. The annular seals 137, and perforations 131,133,135 are positioned such that when the switching means 127 is in the default state, fluid flows through the inlet 105, in through the inlet perforations 131 into the interior of the tube 129 and out through first outlet perforations 133 into and out through the first outlet 107. One or more of the annular seals 137 are placed to prevent the flow of fluid into the second outlet 109. As illustrated further in FIG. 6 below, when the switching means is moved to the active state by sliding the tube 129 within the interior of the housing, the fluid flows in through the inlet 105 and the inlet perforations 131 into the interior of the tube 129 and out through second outlet perforations 135 into the second outlet 109. The annular seals 137 in this configuration are disposed to prevent flow of fluid out through the first outlet 107. The housing 103 and the perforated tube 129 are preferably circular in cross-section as illustrated, but other cross-sectional shapes, such as polygonal, oval, or other shapes, are contemplated.

The valve 101 comprises a fluid metering means 139, which preferably comprises a water turbine 141 disposed within the cavity of the tube 129 of the switching means 127. The turbine 141 is disposed relative to the inlet perforations 131 and the first outlet perforations 133 so that when the switching means 127 is in the default state, fluid flowing through the valve will turn the turbine 141. The turbine 141 preferably drives a gear train 142 through turbine shaft 143, which cooperates with a setting means 145.

The setting means 145 preferably comprises a pressure surface 147 and a preset means 149 interlocked to the gear train 142. The preset means 149 is designed to allow a predetermined amount of water to flow through the valve before the switching means 127 activates to change the flow of water out through the second outlet 109. The movement of water turns the turbine 141 and gear train 142, which in turn drives the mechanism of the preset means 149. When the mechanism of the preset means 149 reaches a certain alignment it activates the setting means 145 which changes the switching means 127 to an active state. The point at which the preset means 149 mechanism becomes aligned to activate the setting means 145 can be preset by the user to predetermine any desired amount of water flowing through the valve. The preset means 149 preferably comprises a flat surface 151, which is rotated within a plane by the turbine 141 of the metering means 139 through the gear train 142. A rod 153 extends from the gear train toward the flat surface 151 in an alignment perpendicular to the flat surface 151. While in the setting means is default state 145 and while water is flowing through the valve as illustrated in the figure, the end of the rod 153 abuts the flat surface 151 due to the hydraulic pressure of the fluid on the pressure surface 147. The end of rod 153 slides along the surface of the flat surface 151 as it rotates. Power for rotation of the flat surface 151 is provided by the turbine 141. This is accomplished by providing the rod 153 with gear teeth 155, which cooperate with mating gear teeth 157 on the flat surface 151. The turbine 141 rotates the rod 153 by means of the gear train 142. The rotating rod 153 in turn drives the rotation of the flat surface 151. An aperture 159 is provided in the flat surface 151 such that counter-clockwise rotation (in FIG. 3) of the flat surface 151 brings the aperture 159 in alignment with the abutting rod 153. The force of the fluid upon the pressure surface 147 forces the rod 153 into the aperture 159, thus affecting an activation of the setting means 145, which in turn sets the fluid switching means 127 to the active state.

The preset position of the aperture 159 with respect to the rod 153 at the beginning of the cycle will determine the amount of fluid flow required to activate the setting means 145. This relative position of the aperture 159 may be fixed, but also may be changeable by a suitable mechanism if it is desired to change the predetermined amount of fluid flow. If changeable, the presetting of the position of the aperture 159 before operation of the valve may be achieved by rotation of the flat surface by a suitable mechanism, such as a knob means with setting knob 121 operated by the user. Such a knob means is described more fully below.

Also shown is an abutment 163 extending out from the flat surface 151. Before fluid is flowing through the valve, the aperture 159 on the flat surface 151 can be rotated clockwise (in FIG. 3) such that the rod 153 is positioned over the abutment 163. At this position, once fluid begins to flow though the valve the fluid pressure cannot force an engagement of the teeth of the rod 153 and of the teeth the flat surface 151. In this condition, the flat surface 151 will, therefore, not rotate, and the setting means 145 will remain in the default state with water flowing out the first outlet 107. In this way it is possible to set the valve such that water will continue to flow out through the first outlet 107 with no switching of the water flow to the second outlet 109.

The valve 101 comprises a resetting means 165 to reset the switching means 127 from the active state to the default state when water stops flowing through the valve 101. The resetting means 165 preferably comprises a resetting spring 167. While fluid is flowing through the valve 101 and the switching means 127 is the active state, the fluid pressure against the pressure surface 147 of the setting means 145 provides a force that acts against the resetting spring 167 and maintains the setting means 145 in the active state. When fluid ceases to flow through the valve 101 there is no fluid pressure on the pressure surface 147 to oppose the resetting spring 167 and the resetting spring 167 returns the switching means 127 to the default state.

Figure 4:
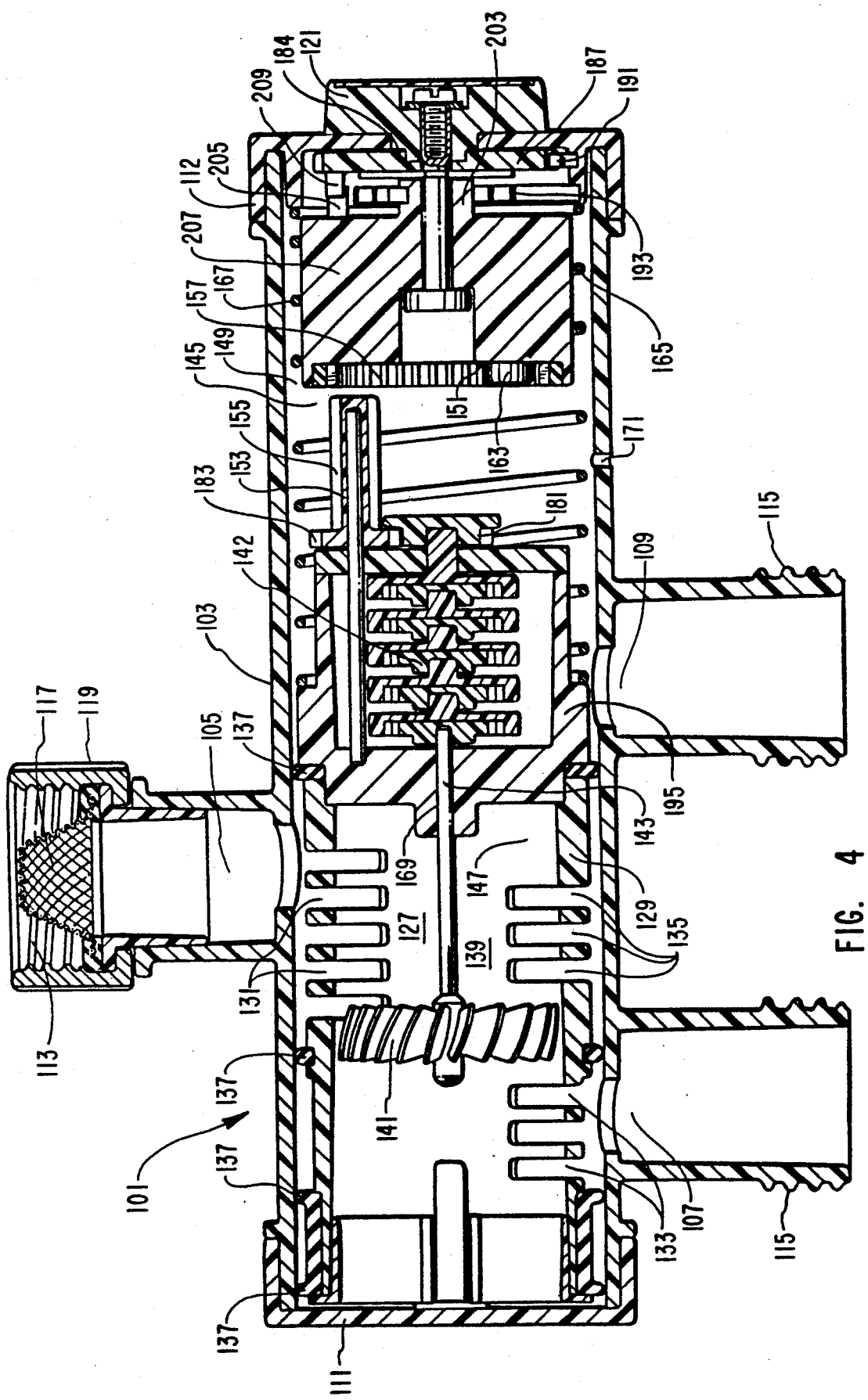
FIG. 4 is a sectional view of the valve of the invention of FIG. 3, showing the switching means of the valve in the default state while no fluid is flowing through the valve.
Figure 5:
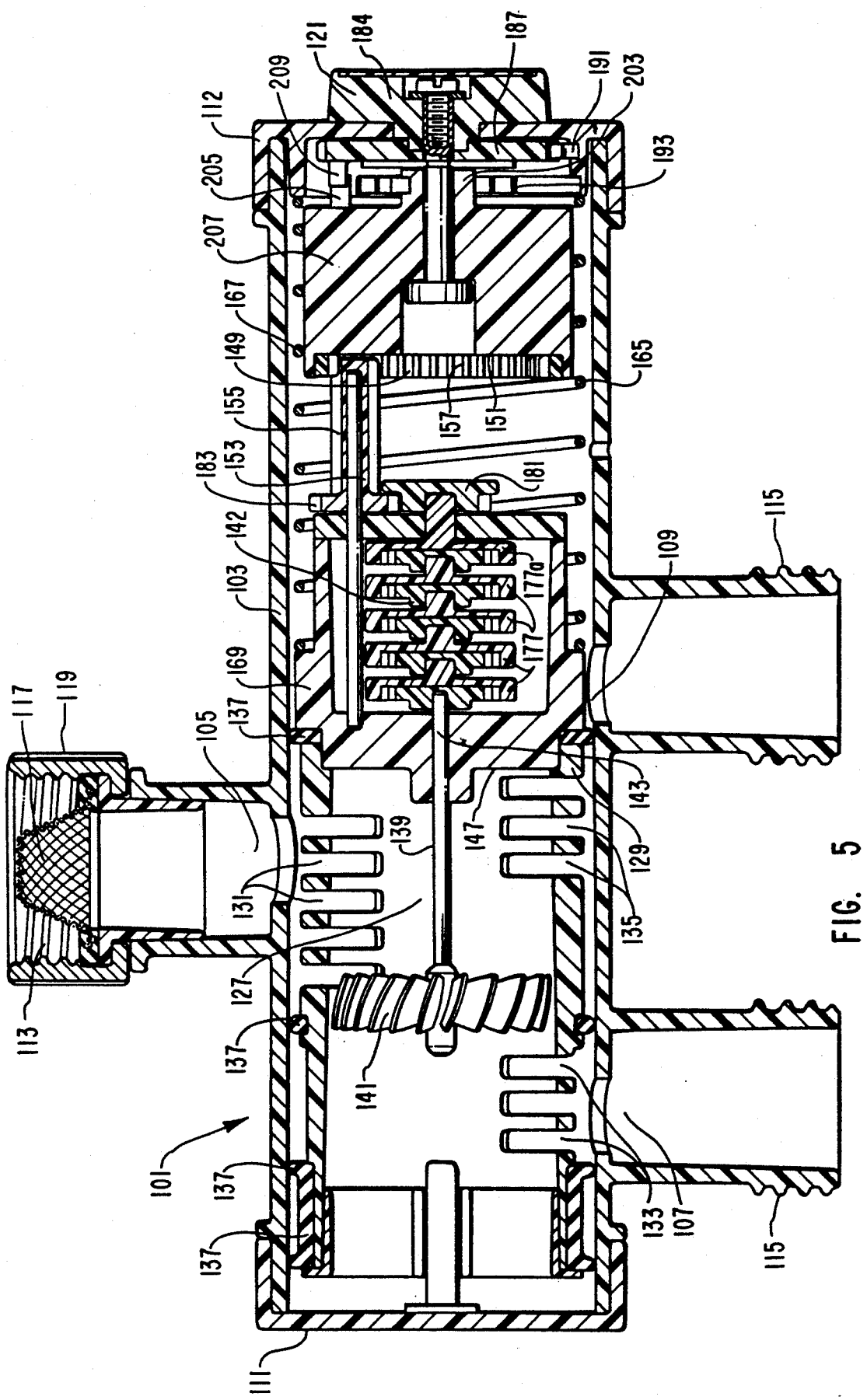
FIG. 5 is a sectional view of the valve of the invention as in FIG. 4, showing the switching means of the valve in the default state while fluid is flowing through the valve.
Figure 6:
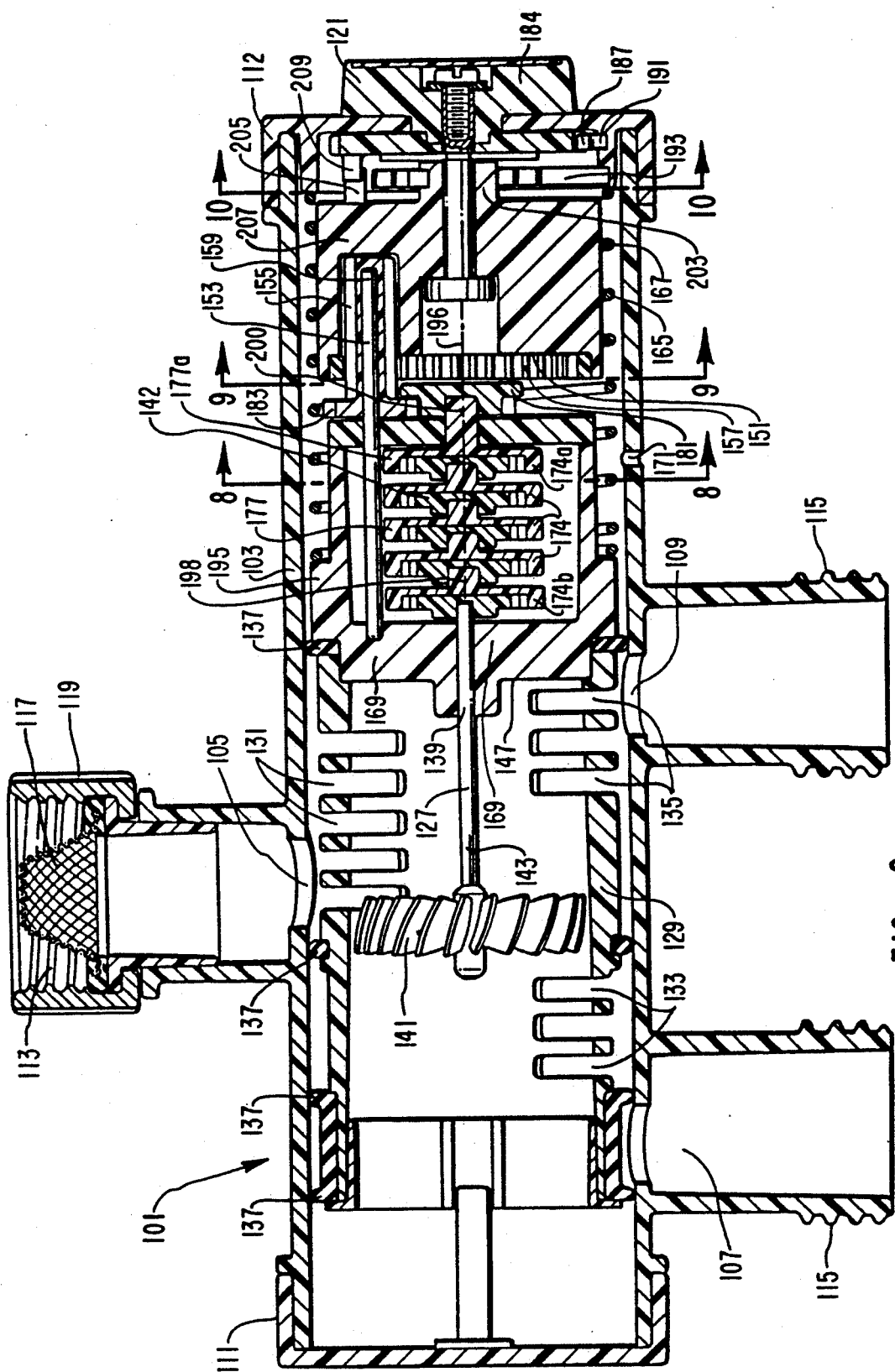
FIG. 6 is a sectional view as in FIG. 5 showing the switching means of the valve in the active state.

FIGS. 4, 5 and 6, which are sectional view of the valve of FIG. 3 through lines 4—4, further show operation of the valve. FIG. 4 shows the valve 101 in the default state with no fluid flowing through the valve. The resetting spring 167 has forced the sliding perforated tube 129 of the setting means 145 to the furthest possible position to the left. The turbine 141, gear train 142, and rod 153 are attached to the sliding tube 129, thus movement of the tube 129 to the far left disengages the gear teeth 155 of the rod 153 from the matching teeth 157 on the flat surface 151. This allows the flat surface 151 to move freely, allowing the user to preset the amount of fluid required to activate the setting means 145 by changing the relative position of the aperture 159 to the rod 153.

In FIG. 5, fluid is flowing through the valve 101 through the fluid inlet 105, inlet perforations 131, first outlet perforations 133, and first outlet 107. Rubber annular seals 137 prevent flow of water out through the second outlet 109. As water flows through the valve it is directed over the turbine 141 which drives the gear train 142 through shaft 143. The fluid pressure upon the pressure surface 147 has forced a slidable assembly 169, which includes the perforated tube 129, turbine 141, pressure surface 147, rod 153, and gear train 142, to the right against the force of the resetting spring 167. This causes the end of the rod 153 to bear against the flat surface 151. The gear teeth 155 on the rod 153 and the gear teeth 157 of the flat surface 151 are then engaged so that the gear train 142 rotates the flat surface 151 through rod 153 as the flowing fluid turns the turbine 141.

In FIG. 6, the aperture 159 in the flat surface has aligned with the rod 153, allowing the rod 153 to enter the aperture 159. The fluid pressure on the pressure surface 147 forces the assembly 169 of the perforated tube 129, turbine 141, gear train 142, and rod 153 further to the right as the rod enters the aperture 159. Fluid flow is now directed from the inlet perforations 131 out through the second outlet perforations 135 and the second outlet 109. The annular seals 137 prevent the fluid from flowing out through the first outlet 107. A bleeder hole 171 is provided to allow any air and/or fluid that may be in the left end of the housing 103 and possibly impede the travel of the assembly 169 to the left to bleed out to the exterior of the housing 103.

When the flow of water stops, there is no force to oppose the resetting spring 167, which then pushes the assembly 169 to the extreme left to the configuration of FIG. 4, thus resetting the valve for the next cycle.

Figure 7:
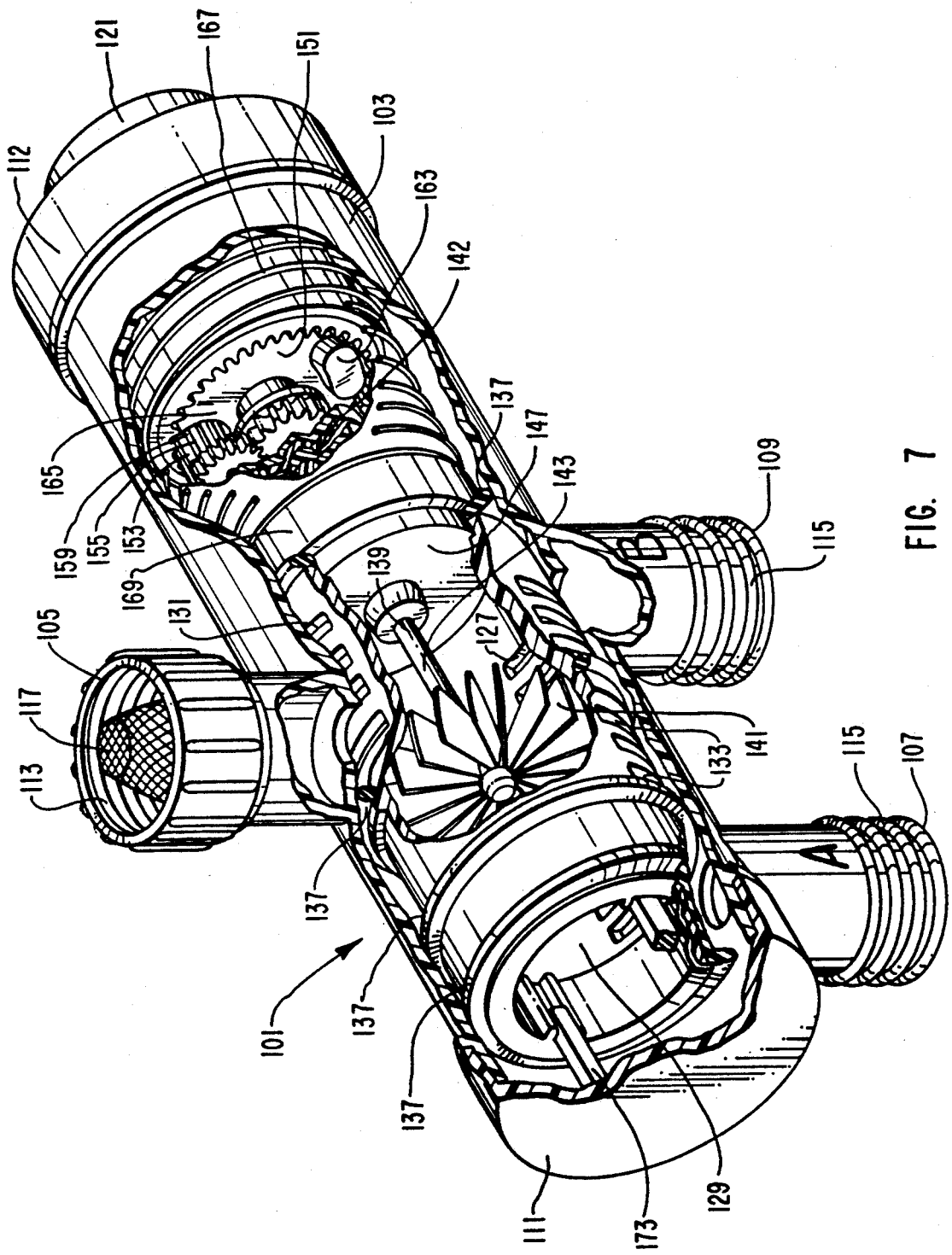
FIG. 7 is a perspective view of a liquid valve as in FIG. 1a, but with the valve partially in section, showing the setting means in the active state.

FIG. 7 is the perspective view in partial section of the valve as in FIG. 3, except the switching means 127 of the valve is in the active state as in FIG. 6. The rod 153 is fully in the aperture 159. The perforated tube 129 is positioned to direct fluid flowing in from the inlet 105 and inlet perforations 131 out through the second outlet perforations 135, and second outlet 109. Note that the housing 103 is provided with guides 173 upon which the perforated tube 129 can slide.

The gear train 142 may be any suitable mechanical speed-reducing system that reduces the rapid rotation of the turbine 141 to the rotating rod 153 at a sufficiently reduced rotation speed and with sufficient torque to suitable operate the setting means 145. Suitable systems include any of various planetary-type gear systems, for example, those used in prior-art water timers. Planetary-type systems are preferred because they can achieve a large speed reduction ratio and can be manufactured compactly.

Figure 8:
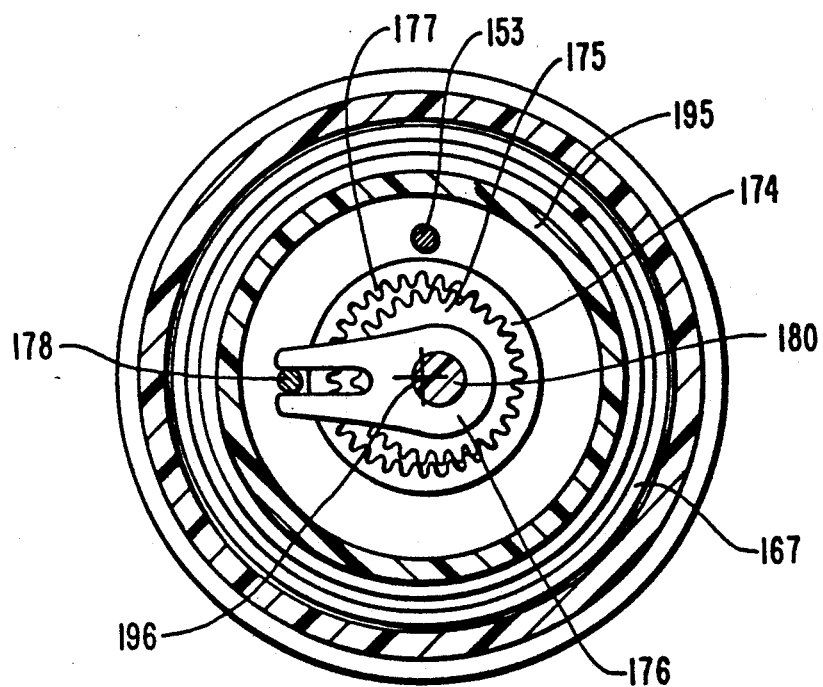
FIG. 8 is a sectional view of the valve through line 8—8 of FIG. 6.

The function of the gear train of a preferred embodiment of the invention can be shown by reference to FIG. 6 and FIG. 8, which is a cross-sectional view of the gear train through lines 8—8 of FIG. 6. The gear train 142 is housed in a gear train housing 195 to allow it to be constructed as part of the slidable assembly 169. The slidable assembly comprises the perforated tube 129, turbine 141, pressure surface 147, rod 153, and gear train 142. The gear train 142 comprises a plurality of stacked gear sets 174, 174a with each set comprising a pinion 175 engaging an internal gear wheel 177. The pinion 175 is fixed to a fork 176 which cooperates with gear housing pin 178 to substantially prevent rotation of the pinion 175 relative to the gear train housing 195. Instead of fully rotating, the pinion 175 goes through a rocking motion as it moves in a planetary fashion around the internal gear wheel 177. The gear housing pin 178 extends through and is fixed to the gear train housing 195. Each gear set 174, 174a functions by revolving or cranking the center shaft 180 of the pinion 175 in an orbit around a center axis 196 of the gear train 142. As the rotation of the pinion 175 is limited by fork 176 and gear housing pin 178, the motion is transmitted to the internal gear 177, which rotates in the same direction as the revolving pinion center shaft 180 about center axis 196.

The speed of rotation of the internal gear 177 is reduced with respect to the speed of revolution of the pinion center shaft 180, the gear reduction ratio being determined by the relative number of teeth on the pinion ($N_p$) and the number of teeth on the internal gear ($N_i$) as determined by the following formula, where the gear reduction ratio (R) is the rotational speed of the internal gear 177 about the center axis 196 divided by the speed of revolution of the pinion center shaft 180 about the center axis 196;

$$R = \frac{N_i - N_p}{N_i}$$

Referring to FIG. 6, each internal gear 177 has a boss 198 on the opposite side of the gear wheel from its gear teeth 199. As the internal gear 177 rotates, the boss 198, which is eccentric or offset from the center axis 196, revolves about the center axis 196 in a cranking motion. Thus, the boss functions as the pinion center shaft 180 of the pinion gear of the adjoining gear set. The revolution of the boss 198 about the center axis 196 cranks or revolves the pinion center shaft 180 of the succeeding gear set (such as 174 or 174a) which then functions in the same manner previously described.

The motion is thereby passed from one gear set 174 to the next, resulting in a multiplied speed reduction. The internal gear 177a of the last gear set 174a drives the output of the gear train 142. This last internal gear 177a has no boss attached thereto, but instead has attached thereto the output shaft 200 of the gear train 142 centered on the central axis 196 of the gear train 142. The output shaft 200 therefore rotates with the last internal gear on the central axis, and drives a drive gear 181, which in turn is connected to a rod gear 183, which rod gear 183 is fixed to and rotates the rod 153.

The input of the gear train 142 is the shaft 143 of the turbine 141, which is aligned on the center axis 196 of the gear train 142. The pinion shaft for the pinion gear in the first gear set 174b is in the form a sleeve (not shown) fixed around the turbine shaft 143 with an the aperture for the turbine shaft 143 offset from the center of the sleeve. The offset provides the proper revolving or cranking motion for the pinion center shaft 180 of the first gear set 174b.

Figure 9:
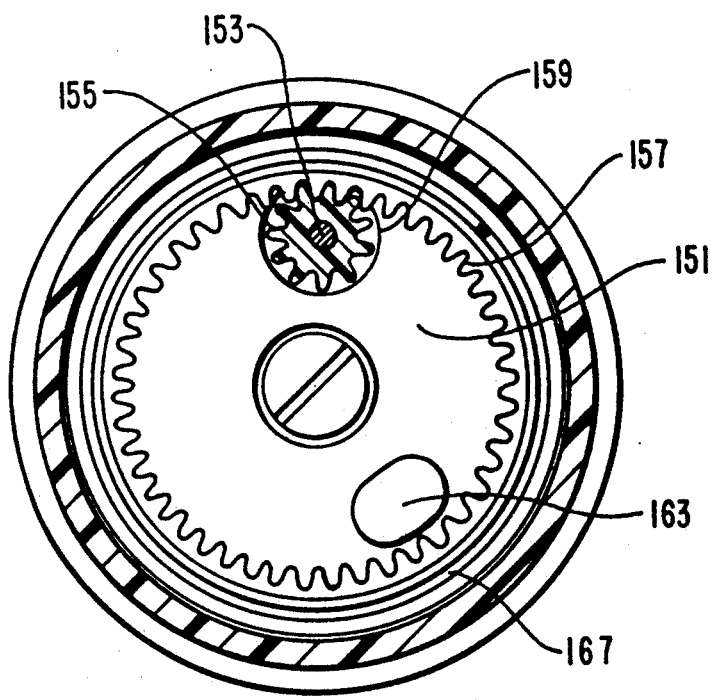
FIG. 9 is a sectional view of the valve through line 9—9 of FIG. 6.

FIG. 9, which is a cross-section through line 9—9 of FIG. 6, shows the flat surface 151, with the gear teeth 155 of the rod 153 engaging the gear teeth 157 of the flat surface 151, and the rod 153 aligned with and disposed within the aperture 159. Also shown is the abutment 163 on the flat surface 151.

Figure 10:
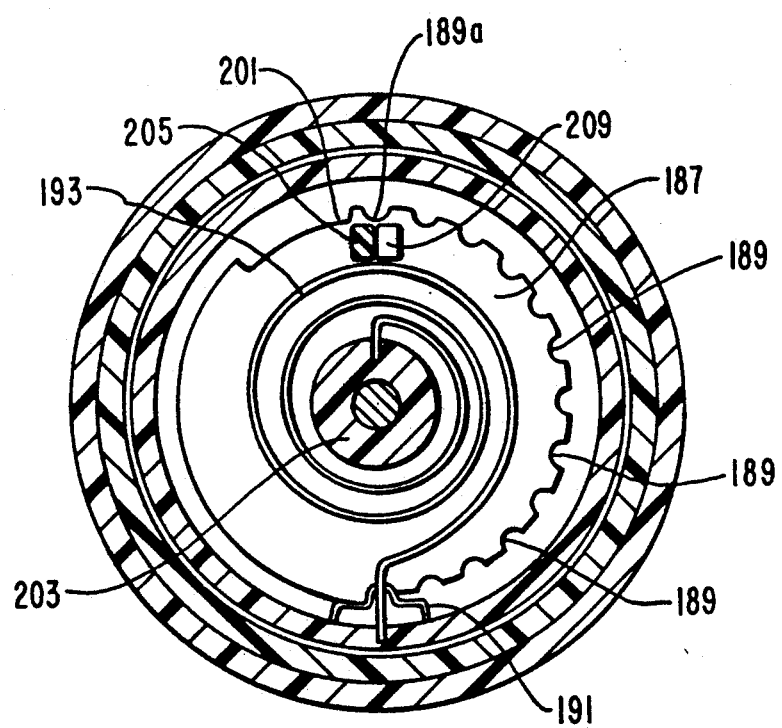
FIG. 10 is a sectional view of the valve through line 10—10 of FIG. 6.

FIG. 10 is a cross-section through line 10—10 of FIG. 6. Referring to FIG. 6 and FIG. 10, illustrated is a knob means 184 for presetting the relative positions of the rod 153 and the aperture 159. After the resetting means 165 resets the switching means 127 from the active state back to the default state, it is desirable the previously preset alignment of the aperture 159 to the rod 153 be restored, such that the preset water flow set by the user before the cycling of the valve be restored to the same value for the next watering session.

This can be accomplished by the preset means illustrated by referring to FIGS. 4 to 6 and 10. With no water flowing through the valve 101, as in FIG. 4, the cam 187 can be rotated by the user rotating the knob 121. Rotating the knob 121 rotates the cam under the detent spring 191. The indentations 189, 189a, in the cam cooperate with the detent spring 191 to hold the cam 187 at the desired setting. In FIG. 10, the shown position corresponds to the "B" setting on the knob 121, i.e., where the switching means 127 is changed from the default to the active state as soon as water begins to flow through the valve 101, and water is directed through the second outlet 109. As the cam 187 is rotated clockwise in FIG. 10, the preset watering volume to first outlet 107 increases from zero, represented by the "B" setting, up to the point where the detent spring 191 is in the last indentation 189a, which corresponds to the highest preset watering time. A rotation of the cam 187 past the last indentation 189a sets detent spring 191 in the wide depression 201 in the cam edge, which corresponds to the "A" position on the knob. In this position the flat surface 151 will not rotate when water is flowing through the valve 101 due to the position of the abutment 163 preventing engagement of the gear teeth 157 of the flat surface 151 and the teeth 155 of the rod 153. The setting means will, therefore, remain the default state with water flowing through the first outlet 107.

The flat surface 151 is rotatable on the flat surface shaft 203, which extends through the center of the cam 187. A spiral spring 193 is attached with one end to the flat surface shaft 203 and the other to the end cap 112. The spiral spring 193 is biased to place a clockwise torque (in FIG. 10) on the flat surface shaft 203. The flat surface 151 is prevented from free rotation from the torque of the spiral spring 193 by two abutting projections, a projection 205 extending from assembly 207, which includes the flat surface 151, and another projection 209 from the cam 187. The position of the flat surface 151 at the beginning of a watering cycle is thus determined by the position of the cam 187, as set by the knob 121 and held in place by detent spring 191.

When water begins to flow through the valve 101, as in FIG. 5, the flat surface rotates around the flat surface shaft 203 in a counter-clockwise direction (in FIG. 10), tightening the spiral spring 193. The spiral spring 193 tightens until the setting means 145 changes from the default to the active state. As seen in FIG. 6, the position of the flat surface 151 in the active state is locked by the presence of rod 153 in the aperture 159. Because of this the relative position of the flat surface 151 and position of the cam 187 remain constant until the flow of water through the valve ceases and the setting means resets back to the default state. Upon this resetting of the setting means, the flat surface 151 is free to rotate, and is rotated clockwise (in FIG. 10) by the spiral spring 193, which relaxes until the two projections 205, 209 come into an abutting relationship. The flat surface 151 is thereby returned to the position which existed before the watering cycle.

The material of the components of the valve of the invention, may be any suitable material, such as cast metal, machined metal, stamped metal, cast plastic materials, and the like. Preferably, where appropriate, the components are formed by injection molding of plastic. It is understood that certain fasteners, shafts, and the like may be more appropriately made of metal.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention. It is also understood, that while the valve of the invention has been primarily described as useful for metering water for lawn irrigation, it is understood, that the valve of the invention may be useful for metering other fluids, both liquid and gaseous.

What is claimed is:

1. A fluid control valve comprising;
   a housing having a fluid inlet, a first fluid outlet and a second fluid outlet,
   a fluid switching means having a default state and an active state, which switching means in the default state directs fluid flowing through the housing from the inlet out through the first outlet and in the active state from the inlet out through the second outlet,
   a pressure surface operatively connected to the switching means adapted to allow the pressure of fluid flowing through the housing to exert a force on the switching means sufficient to bias movement of the switching means from the default state to the active state, a flat surface that is rotatable within its place with an aperture in the flat surface, a rod operatively connected to the fluid switching means and perpendicularly aligned with the flat surface such that the aperture can be aligned with the rod upon rotation of the flat surface, such that when the aperture is not aligned the force causes the rod to bear against the flat surface to prevent the force from moving the switching means from the default state into the active state and when the aperture is aligned the force moves the rod into the aperture to allow the force to move the switching means from the default state to the active state, a means for rotating the flat surface, such that the flat surface is rotated from an alignment where the aperture is not aligned with the rod to an alignment where the aperture is aligned with the rod after a predetermined amount of fluid has passed through the housing out through the first outlet, and a resetting means that resets the switching means from the active state to the default state when fluid has ceased to exert sufficient pressure on the pressure surface to provide the force biasing movement toward the active state.

2. The valve of claim 1 wherein the inlet communicates with a second outlet of a similar valve.

3. The valve of claim 1 wherein the second outlet communicates with an inlet of a similar valve.

4. The valve of claim 1 wherein the switching means comprises a perforated tube which is disposed in the housing such that it can slide within the interior of the housing to different positions within the housing, the perforations placed to selectively direct flow out through the first outlet or the second outlet, dependent upon the position of the tube in the housing.

5. The valve of claim 1 wherein the means for rotating the flat surface comprises a turbine.

6. The valve of claim 1 wherein the resetting means is a spring that is biased to move the switching means from the active state to the default state.

7. The valve of claim 1 additionally comprising a means operatively connected with the flat surface which permits setting of the predetermined amount of fluid which will pass through the valve before the switching means changes from the default to the active state.

8. The valve of claim 1 additionally comprising a means for restoring the setting of the predetermined amount to its initial setting after the predetermined amount of fluid has passed through the valve and the fluid has ceased flowing through the valve.

9. A fluid control valve comprising;

a housing having a fluid inlet, a first fluid outlet and a second fluid outlet, a fluid switching means having a default state and an active state, which switching means in the default state directs fluid flowing through the housing from the inlet out through the first outlet and in the active state from the inlet out through the second outlet, a pressure surface operatively connected to the switching means adapted to allow the pressure of fluid flowing through the housing to exert a force on the switching means sufficient to bias movement of the switching means from the default state to the active state, a flat surface that is rotatable within its place with an aperture in the flat surface, a rod operatively connected to the fluid switching means and perpendicularly aligned with the flat surface such that the aperture can be aligned with the rod upon rotation of the flat surface, such that when the aperture is not aligned the force causes the rod to bear against the flat surface to prevent the force from moving the switching means from the default state into the active state and when the aperture is aligned the force moves the rod into the aperture to allow the force to move the switching means from the default state to the active state, the rod having gear teeth adapted to engage gear teeth attached to the flat surface when the rod bears against the flat surface such that rotation of the rod rotates the flat surface in its plane.

a turbine means operatively connected to the rod to rotate the rod when fluid is flowing through the housing and out of the first outlet, a means for setting the flat surface in an alignment where the aperture is not aligned with the rod and rotation of the rod by the turbine means will bring the aperture into alignment with the rod, and a resetting means that resets the switching means from the active state to the default state when fluid has ceased to exert sufficient pressure on the pressure surface to provide the force biasing movement toward the active state.

10. The valve of claim 9 wherein the switching means comprises a perforated tube which is disposed in the housing such that it can slide within the interior of the housing to different positions within the housing, the perforations placed to selectively direct flow out through the first outlet or the second outlet, dependent upon the position of the tube in the housing.

11. The valve of claim 9 wherein the resetting means is a spring that is biased to move the switching means from the active state to the default state.

12. The valve of claim 9 additionally comprising a means for restoring the setting of the relative alignment between the aperture and the rod to its initial setting after the resetting means has reset the switching means.

13. A watering system comprising a plurality of valves connected in series, each valve comprising;

a housing having a fluid inlet, a first fluid outlet and a second fluid outlet, a fluid switching means having a default state and an active state, which switching means in the default state directs fluid flowing through the housing from the inlet out through the first outlet and in the active state from the inlet out through the second outlet, a pressure surface operatively connected to the switching means adapted to allow the pressure of fluid flowing through the housing to exert a force on the switching means sufficient to bias movement of the switching means from the default state to the active state, a flat surface that is rotatable within its place with an aperture in the flat surface, a rod operatively connected to the fluid switching means and perpendicularly aligned with the flat surface such that the aperture can be aligned with the rod upon rotation of the flat surface, such that when the aperture is not aligned the force causes the rod to bear against the flat surface to prevent the force from moving the switching means from the default state into the active state and when the aperture is aligned the force moves the rod into the aperture to allow the force to move the switching means from the default state to the active state, a means for rotating the flat surface, such that the flat surface is rotated from an alignment where the aperture is not aligned with the rod to an alignment where the aperture with the rod after a predetermined amount of fluid has passed through the housing out through the first outlet, and a resetting means that reset the switching means from the active state to the default state when fluid has ceased to exert sufficient pressure on the pressure surface to provide the force biasing movement toward the active state, wherein the inlet of each valve communicates with the second outlet of the previous valve, except the inlet of the first valve which communicates with a water source.

14. The system of claim 13 wherein one or more watering devices communicates with the first outlets of each valve and with the second outlet of the last valve in the series.

15. The system of claim 13 wherein the water source may be turned on and off by an automatic valve.

* * * * *